United States Patent
Kang et al.

(10) Patent No.: US 7,440,220 B1
(45) Date of Patent: Oct. 21, 2008

(54) METHOD FOR DEFINING A TOUCH-DOWN POWER FOR HEAD HAVING A FLYING HEIGHT ACTUATOR

(75) Inventors: Soo-Choon Kang, San Jose, CA (US); Michael Nojaba, Milpitas, CA (US); Rex Niedermeyer, Newark, CA (US)

(73) Assignee: Western Digital (Fremont), LLC, Fremont, CA (US)

( * ) Notice: Subject to any disclaimer, the term of this patent is extended or adjusted under 35 U.S.C. 154(b) by 0 days.

(21) Appl. No.: 11/754,606

(22) Filed: May 29, 2007

Related U.S. Application Data

(60) Provisional application No. 60/940,652, filed on May 29, 2007.

(51) Int. Cl.
G11B 21/02 (2006.01)
(52) U.S. Cl. .................................... 360/75
(58) Field of Classification Search ............ None
See application file for complete search history.

(56) References Cited

U.S. PATENT DOCUMENTS

| | | | |
|---|---|---|---|
| 5,594,595 A | 1/1997 | Zhu | |
| 5,943,189 A | 8/1999 | Boutaghou et al. | |
| 5,991,113 A | 11/1999 | Meyer et al. | |
| 6,052,243 A | 4/2000 | Shimada | |
| 6,097,559 A | 8/2000 | Ottesen et al. | |
| 6,288,856 B1 | 9/2001 | Ottesen et al. | |
| 6,359,746 B1 | 3/2002 | Kakekado et al. | |
| 6,501,606 B2 | 12/2002 | Boutaghou et al. | |
| 6,529,342 B1 | 3/2003 | Feng et al. | |
| 6,577,466 B2 | 6/2003 | Meyer et al. | |
| 6,624,984 B2 | 9/2003 | Lewis et al. | |
| 6,700,724 B2 | 3/2004 | Riddering et al. | |
| 6,717,764 B2 | 4/2004 | Lake | |
| 6,775,089 B1 | 8/2004 | Bonin et al. | |
| 6,798,605 B2 | 9/2004 | Kurita et al. | |
| 6,801,376 B2 | 10/2004 | Smith | |
| 6,822,816 B2 | 11/2004 | Dakroub | |
| 6,876,509 B2 | 4/2005 | Bonin et al. | |
| 6,975,472 B2 | 12/2005 | Stover et al. | |
| 6,980,383 B2 | 12/2005 | Brunnett et al. | |
| 7,016,131 B2 | 3/2006 | Liu et al. | |
| 7,023,647 B2 | 4/2006 | Bloodworth et al. | |
| 7,038,875 B2 | 5/2006 | Lou et al. | |
| 7,068,457 B2 | 6/2006 | Riddering et al. | |
| 7,079,353 B2 | 7/2006 | Hsiao et al. | |
| 7,092,193 B1 | 8/2006 | McKenzie et al. | |

(Continued)

Primary Examiner—K. Wong
(74) Attorney, Agent, or Firm—Barcelo & Harrison, LLP

(57) ABSTRACT

A novel method for defining a touch-down power for a head that has a head-based flying height actuator is disclosed and claimed. A linear relationship between power and spacing is derived by fitting to first and second transducer-disk spacings corresponding to first and second electrical powers applied to the head-based flying height actuator. A third spacing between the transducer and the disk is determined when a greater third electrical power is applied to the flying height actuator. An estimated third spacing between the transducer and the disk, corresponding to application of the third electrical power to the flying height actuator, is calculated using the derived linear relationship and the third electrical power. The touch-down power is defined to be substantially equal to the second electrical power if an error between the third spacing and the estimated third spacing is larger than a first threshold.

18 Claims, 5 Drawing Sheets

U.S. PATENT DOCUMENTS

| | | | |
|---|---|---|---|
| 7,180,692 B1 * | 2/2007 | Che et al. .................. 360/31 |
| 2003/0002183 A1 | 1/2003 | Fioravanti |
| 2003/0218813 A1 | 11/2003 | Dakroub |
| 2004/0075940 A1 | 4/2004 | Bajorek et al. |
| 2004/0130820 A1 | 7/2004 | Ota |
| 2004/0184192 A1 | 9/2004 | Ota et al. |
| 2005/0128630 A1 | 6/2005 | Huang et al. |
| 2005/0243743 A1 | 11/2005 | Hu et al. |
| 2006/0028754 A1 | 2/2006 | Suk |
| 2007/0268615 A1 | 11/2007 | McFadyen et al. |

* cited by examiner

200

204 — Determine a 1st spacing, $S_1$, between the transducer and disk when a 1st electrical power, $P_1$, is applied to the flying height actuator.

208 — Determine a $N^{th}$ spacing, $S_N$, when a larger $N^{th}$ electrical power, $P_N$, is applied to the flying height actuator.

210 — Derive a linear relationship between power and spacing, fit to $P_1$, $S_1$, $P_N$, and $S_N$.

212 — Determining a $(N+1)^{th}$ spacing, $S_{N+1}$, when an even larger $(N+1)^{th}$ electrical power, $P_{N+1}$, is applied to the flying height actuator.

214 — Use the derived linear relationship and $P_{N+1}$ to calculate an estimated $(N+1)^{th}$ spacing, $S_{(N+1)EST}$.

216 — $|S_{N+1} - S_{(N+1)EST}| > $ 1st threshold?

Yes → 218 — Define touch down power $(P_{TD}) \cong P_N$

No → 220 — $|S_{N+1} - S_N| < $ 2nd threshold?

Yes → 218

No → $N = N+1$ → back to 210

FIG. 6

METHOD FOR DEFINING A TOUCH-DOWN POWER FOR HEAD HAVING A FLYING HEIGHT ACTUATOR

RELATED APPLICATIONS

This application claims the benefit of priority under 35 USC §119 to Provisional Patent Application Ser. No. 60/940,652, filed May 29, 2007, which is incorporated herein by reference.

FIELD OF THE INVENTION

The present invention relates generally to the field of information storage devices, and more particularly to the active control of the flying height of read heads used in such devices.

BACKGROUND

Information storage devices are used to retrieve and/or store data in computers and other consumer electronics devices. A magnetic hard disk drive is an example of an information storage device that includes one or more heads that can both read and write, but other information storage devices also include heads—sometimes including heads that cannot write.

The typical hard disk drive includes a head disk assembly (HDA) and a printed circuit board (PCB) attached to a disk drive base of the HDA. Referring now to FIG. 1, the head disk assembly 10 includes at least one disk 11 (such as a magnetic disk, magneto-optical disk, or optical disk), and a track seeking/track following actuator 12, and at least one head gimbal assembly (HGA) that includes a head 14 and a suspension assembly 13. During operation of the disk drive, the track seeking/track following actuator 12 must rotate to position the head 14 adjacent desired information tracks on the disk 11. An arrow on disk 11 indicates the direction of disk rotation in FIG. 1. Track seeking/track following actuator 12 is typically a rotary actuator driven by a voice coil motor. The disk 11 includes a conventional information storage media (e.g. hard magnetic layer protected by a thin overcoat layer and supported by a substrate and various underlayers).

In a magnetic hard disk drive, the head typically comprises a body called a "slider" that carries a magnetic transducer on its trailing end. The magnetic transducer typically comprises a writer and a read element. The magnetic transducer's writer may be of a longitudinal or perpendicular design, and the read element of the magnetic transducer may be inductive or magnetoresistive. In a magnetic hard disk drive, the transducer is typically supported in very close proximity to the magnetic disk by a hydrodynamic air bearing. As the motor rotates the magnetic disk, the hydrodynamic air bearing is formed between an air bearing surface of the slider of the head, and a surface of the magnetic disk. The thickness of the air bearing at the location of the transducer is commonly referred to as "flying height."

Magnetic hard disk drives are not the only type of information storage devices that have utilized air bearing sliders. For example, air bearing sliders have also been used in optical information storage devices to position a mirror and an objective lens for focusing laser light on the surface of disk media that is not necessarily magnetic.

The flying height is a key parameter that affects the performance of an information storage device. Accordingly, the nominal flying height is typically chosen as a careful compromise between each extreme in a classic engineering "trade-off." If the flying height is too high, the ability of the transducer to write and/or read information to/from the disk surface is degraded. Therefore, reductions in flying height can facilitate desirable increases in the areal density of data stored on a disk surface. However, the air bearing between the slider and the disk surface can not be eliminated entirely because the air bearing serves to reduce friction and wear (between the slider and the disk surface) to an acceptable level. Excessive reduction in the nominal flying height degrades the tribological performance of the disk drive to the point where the disk drive's lifetime and reliability become unacceptable.

One way that a disk drive designer can improve the prospects of reaching an acceptable compromise in the "trade-off" described above, is to increase the complexity of the disk drive so as to dynamically control flying height. That is, additional head components and/or disk drive components that can function as a flying height actuator are included and actively controlled so that the flying height can be temporarily reduced only while the head is reading or writing. When the head is not reading or writing, it can "fly" at a slightly-higher nominal flying height to improve tribological performance. Such active control of flying height is sometimes referred to as "dynamic flying height" control (a.k.a. "DFH").

Several types of flying height actuators have been published. One type of head-based flying height actuator incorporates a heating element into or near the magnetic transducer, to temporarily cause thermal expansion of a portion of the transducer and thereby bring it closer to the rotating disk. For example, U.S. Pat. No. 5,991,113 discloses such a resistive heating element, which can cause the pole tips of the transducer to protrude toward the disk relative to the air bearing surface of the slider such that the flying height at the location of the transducer is reduced. Additional examples of head-based flying height actuators employing a heater include U.S. Pat. No. 6,975,472, and U.S. Patent Application Publications US 2004/0184192 and US 2004/0130820.

If a transducer heater is used for flying height actuation via thermal expansion of the head near the transducer, such thermal expansion may also temporarily and locally change the contour of the air bearing surface in such a way that flying height is otherwise increased. That is, such temporary and local changes in the air bearing surface contour may undesirably oppose the intended effect of the transducer heater by increasing flying height when a further decrease is desired. This undesirable phenomenon may be referred to as thermal expansion "push back."

Magnetostrictive material disposed in or adjacent to the magnetic transducer can also be configured to function as a head-based flying height actuator, by causing expansion or translation of all or a portion of the magnetic transducer towards/away from the disk surface. An example of a magnetostrictive flying height actuator is described in U.S. Patent Application Publication 2005/0243473.

Another head-based flying height actuation approach involves controlling the flying height via electrostatic forces, by applying a voltage between the slider and the disk. For example, head-based electrostatic flying height actuation is described in U.S. Pat. No. 6,359,746, U.S. Pat. No. 6,529,342, and U.S. Pat. No. 6,775,089.

Piezoelectric head-based flying height actuators have also been published, for example in U.S. Pat. No. 5,943,189, U.S. Pat. No. 6,501,606 and U.S. Pat. No. 6,577,466. Although in most cases the piezoelectric head-based flying height actuator functions by moving the magnetic transducer relative to the slider, the piezoelectric head-based flying height actuator may be used to change the flying height by altering a crown curvature of the slider (e.g. U.S. Pat. No. 6,624,984).

All of these head-based flying height actuators serve to change the flying height in response to an electrical input. Typically, the greater the electrical power applied to the head-based flying height actuator, the more the flying height will be reduced at the location of the transducer, until a portion of the head touches the disk surface—a condition known as "touch down". Touch-down serves to limit further reductions in flying height, even if/when the electrical power applied to the flying height actuator is further increased. Actual or imminent touch down may even cause an increase in a time-average of flying height due to an increase in push back and/or an increase in flying height oscillations caused by contact forces.

It is generally not desirable to attempt to read or write data with a head while it is in a touch-down condition, because, for example, off-track motions and amplitude and frequency modulation of the read back signal, associated with frequent intermittent contact between the head and the disk, tend to degrade signal to noise ratio and increase error rate. Therefore, it is generally not desirable to attempt to read or write data with a head while its so-called "touch down power" (i.e. the power required to cause touch down) is applied to its head-based flying height actuator. However, the touch down power is, in general, unique to each head. Moreover, techniques to determine the touch down power for a given head have been unsuitable for a high-volume manufacturing environment, inconvenient, and/or have required specialized or expensive equipment. Thus, there is a need in the art for a practical method for defining a touch-down power for a head having a flying height actuator.

SUMMARY

A method for defining a touch-down power for a head that has a head-based flying height actuator is disclosed and claimed. A first spacing between the transducer and the disk is determined when a first electrical power is applied to the flying height actuator. A second spacing between the transducer and the disk is determined when a second electrical power is applied to the flying height actuator. The second electrical power is larger than the first electrical power. A linear relationship between power and spacing is derived by fitting to the first electrical power, the first spacing, the second electrical power, and the second spacing. A third spacing between the transducer and the disk is determined when a third electrical power is applied to the flying height actuator. The third electrical power is larger than the second electrical power. An estimated third spacing between the transducer and the disk, corresponding to application of the third electrical power to the flying height actuator, is calculated using the derived linear relationship and the third electrical power. The touch-down power is defined to be substantially equal to the second electrical power if a first condition is satisfied, the first condition being satisfied if an error between the third spacing and the estimated third spacing is larger than a first threshold.

BRIEF DESCRIPTION OF DRAWINGS

FIG. 2 is not to scale; rather, certain dimensions have been exaggerated so that the microscopic head disk spacing and slight pitch angle can be discerned.

FIG. 3 is not to scale; rather, certain dimensions have been exaggerated so that each of the sub-components of the magnetic transducer can be labeled.

FIG. 6 is a flow chart depicting a method in accordance with an embodiment of the present invention.

DETAILED DESCRIPTION OF EXEMPLARY EMBODIMENTS

Figure 1:
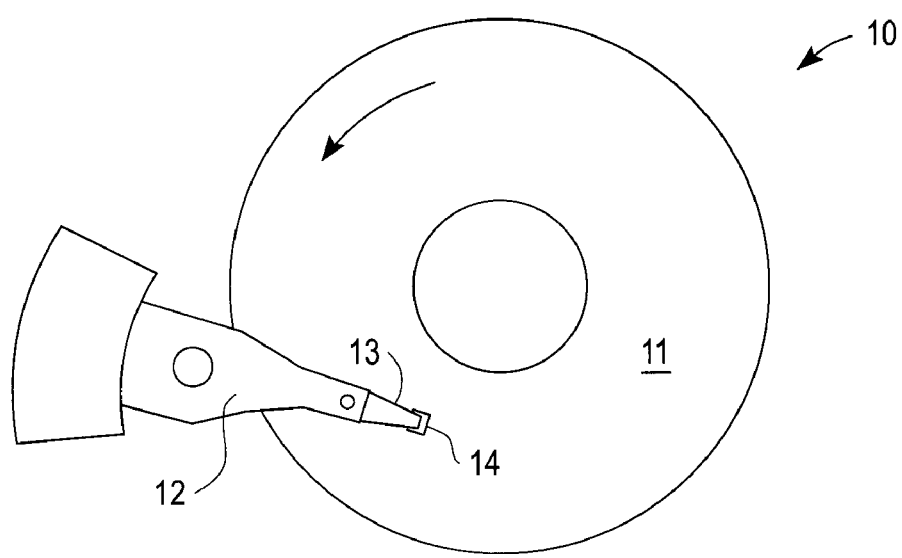
FIG. 1 is an illustration of a track seeking/track following actuator with an attached head gimbal assembly, positioned over a spinning disk in a contemporary disk drive.
Figure 2:
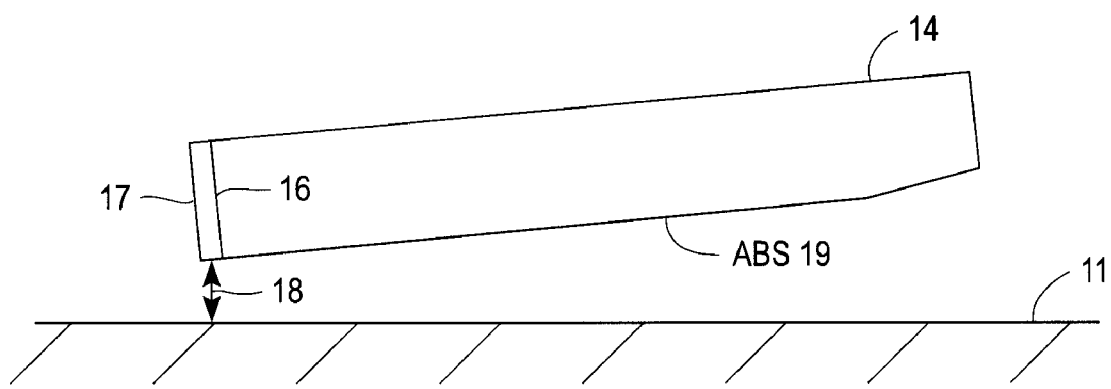
FIG. 2 is an illustration depicting a side-view of a head in operation over a spinning disk, the head being capable of use with an embodiment of the present invention.

FIG. 2 is an illustration depicting a side-view of a head 14 in operation over a spinning disk 11, the head 14 being capable of use with an embodiment of the present invention. FIG. 2 is not to scale; rather, certain dimensions have been exaggerated so that the microscopic transducer-disk spacing 18 and slight pitch angle of air bearing surface (ABS) 19 can be discerned. The slider of head 14 includes a trailing face 16 on which a magnetic transducer 17 is fabricated by conventional photolithographic and vacuum deposition and etching techniques. The transducer 17 of head 14 can be positioned towards or away from the disk 11 relative to ABS 19 by a head-based flying height actuator, which may be included within transducer 17, so that the transducer-disk spacing 18 can be adjusted.

Figure 3:
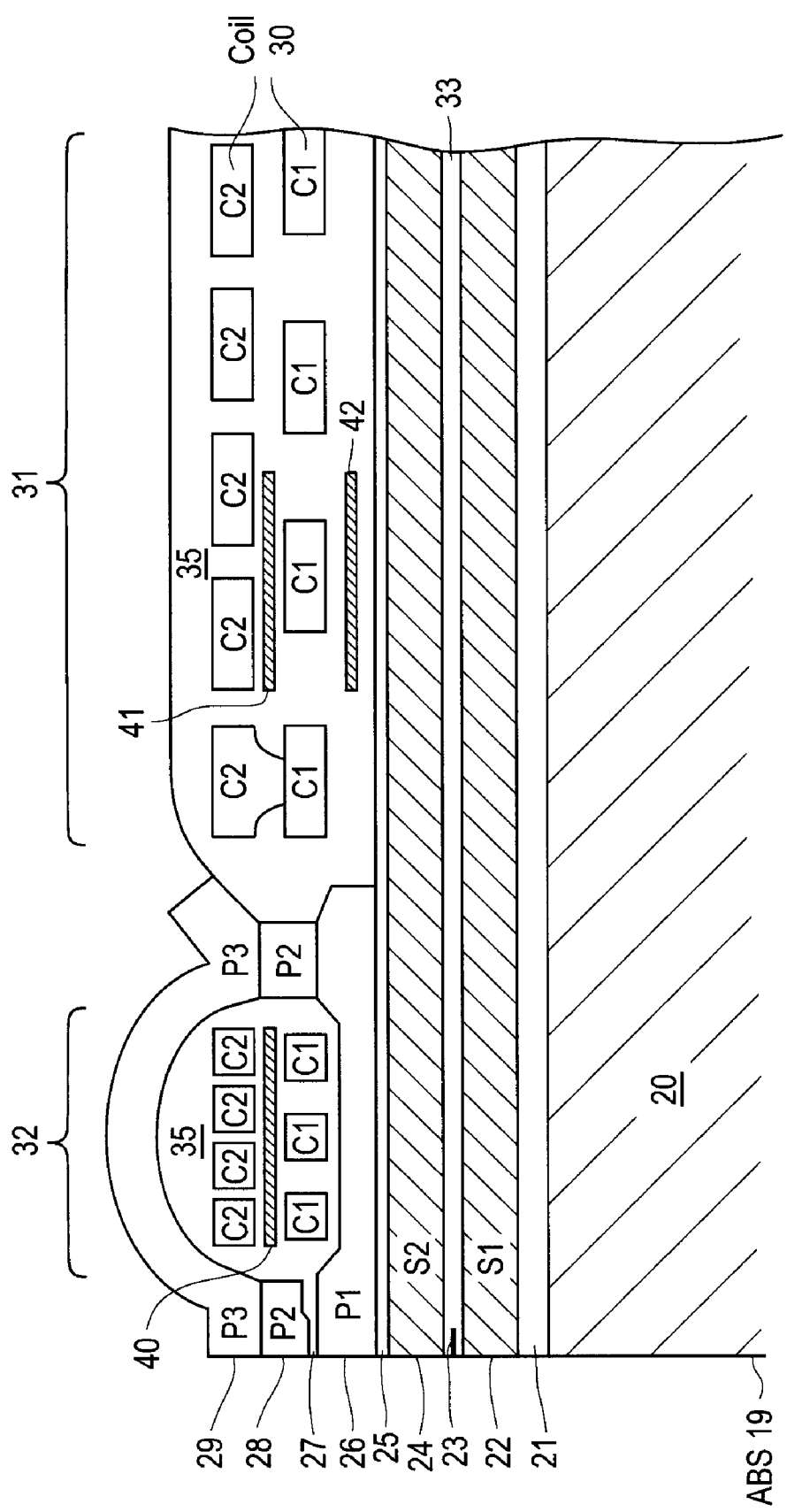
FIG. 3 is cross-sectional view of a magnetic transducer of a head shown to include three alternative exemplary embodiments of a head-based flying height actuator capable of use with the present invention.

FIG. 3 is cross-sectional view of a magnetic transducer shown to include three alternative exemplary embodiments of a head-based flying height actuator capable of use with the present invention. FIG. 3 is not to scale; rather, certain dimensions have been exaggerated so that each of the sub-components of the magnetic transducer can be labeled. The magnetic transducer of FIG. 3 comprises a layered structure formed on the trailing-side surface of a slider 20. Slider 20 may comprise AlTiC (Al2O3-TiC). The magnetic transducer is constructed by depositing and etching various layers on the slider 20.

The reader layers of the magnetic transducer of FIG. 3 include an undercoat 21 consisting of a nonmagnetic material such as alumina (Al2O3); a lower (S1) magnetic shield layer 22 consisting of a soft magnetic material (e.g., NiFe, FeN, CoFe, etc.); a conventional magneto-resistive (MR) element 23 embedded in a nonmagnetic material layer 33; and an upper (S2) magnetic shield layer 24 consisting of a soft magnetic material. The nonmagnetic material layer 33 disposed between layers 22 & 24 and around MR element 23 may comprise aluminum nitride (AlN), aluminum nitrate (AlNO3), or alumina. Information magnetically recorded in the media can be reproduced by detecting changes in the electrical resistance of MR element 23, which occur in response to remnant magnetic fields from a nearby disk media.

The writer layers of the magnetic transducer of FIG. 3 include a first magnetic pole layer 26 consisting of a soft magnetic material; a gap layer 27 comprising a nonmagnetic material 35 (e.g., alumina) that also surrounds the first and second turn layers (C1 & C2) of a coil 30, and is also used in separation layer 25; a second magnetic pole layer 28; and a third magnetic pole layer 29. The second and third magnetic pole layers 28 & 29 typically comprise a soft magnetic material and are connected together. One section of pole layer 26 is also connected to a section of pole layer 28. Alternatively, first pole layer 26 and upper shield layer 24 may be formed as a single integral layer, rather than as the two layers separated by nonmagnetic layer 25.

Collectively, the first, second, and third pole layers comprise the yoke portion 32 of the magnetic transducer. In the magnetic transducer shown in FIG. 3, coil 30 has a first layer of turns C1 and a second layer of turns C2 which pass through the yoke portion 32 of the magnetic transducer (i.e. the portion nearest the trailing edge of ABS 19 between pole layers 26 & 29). The turns of coil 30 also pass outside of the yoke portion in a region 31 that is farther from the trailing edge of ABS 19. A magnetic field can be generated across gap layer 27 by application of current to coil 30 to record information on a nearby magnetic disk media (not shown in FIG. 3).

An overcoat layer (not shown), consisting of a nonmagnetic material, typically covers the entire thin-film transducer. Also, a diamond-like carbon (DLC) material may also be applied to the magnetic transducer to protectively cover the pole tips and/or to enhance tribological performance by covering portions of ABS 19.

A resistive heating element 40 may be integrated into the thin-film transducer to cause protrusion of the pole tips of layers 26, 28 and 29. Resistive heating element 40 serves as a head-based flying height actuator because temporary application of power to the resistive heating element 40 causes a temporary expansion of at least the tips of poles 26, 28, and 29, such that the head-disk spacing at the location of the magnetic transducer is temporarily reduced. Alternatively, a resistive heating element in the position labeled 41, or in the position labeled 42, may serve as the head-based flying height actuator, the position being chosen to cause thermal pole tip protrusion, preferably with limited temperature rise in the magnetoresistive (MR) reading element 23.

Figure 4:
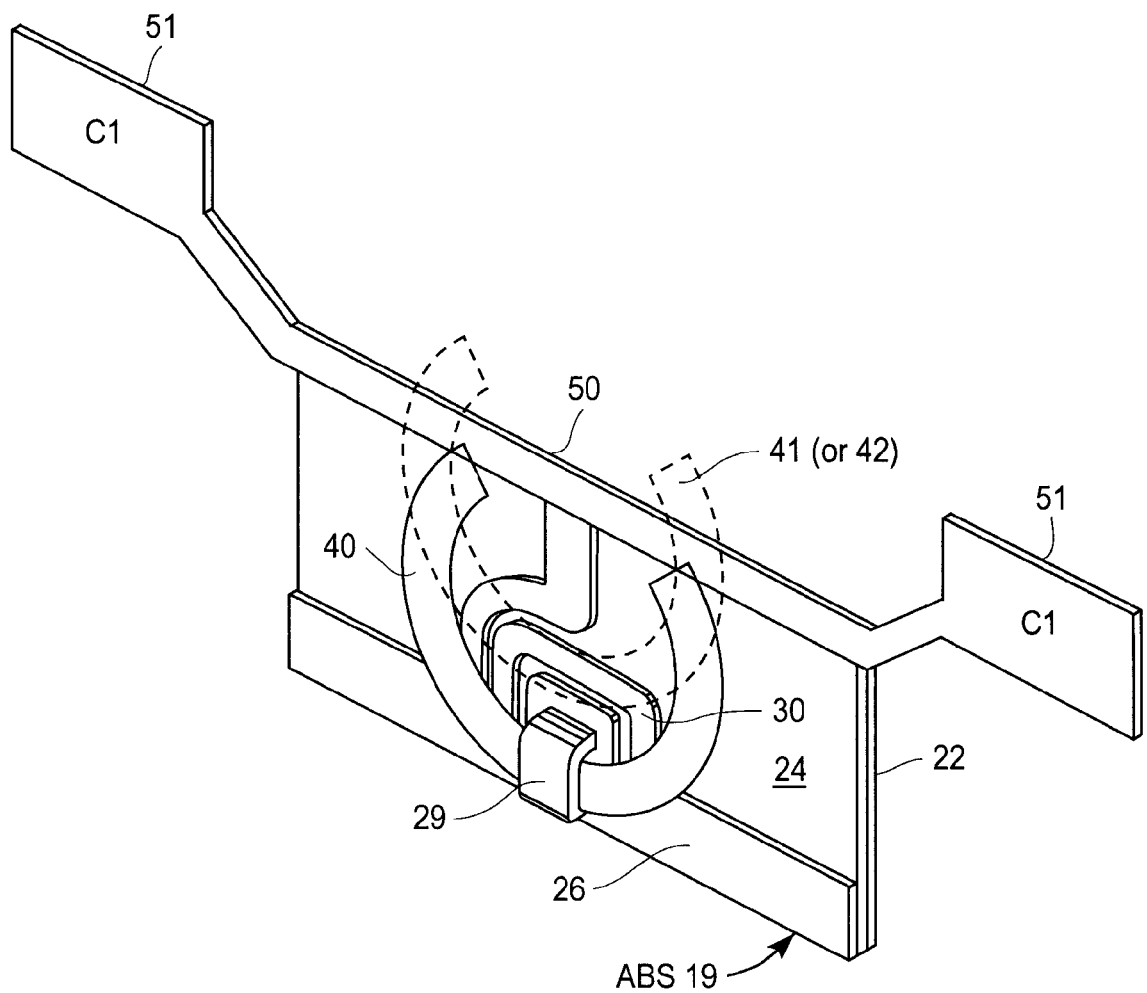
FIG. 4 is a perspective view of a magnetic transducer of a head shown to include three alternative exemplary embodiments of a head-based flying height actuator capable of use with the present invention (not necessarily to scale).

FIG. 4 is a perspective view of a read/write transducer of a head shown to include three alternative exemplary embodiments of a head-based flying height actuator capable of use with the present invention (not necessarily to scale). Number labels in FIG. 4 accord with those used for the same or similar components shown in FIG. 3. As shown in FIG. 4, resistive heating element 40 may have a generally annular shape, e.g., like a horseshoe, having a middle portion passing through the yoke, and having first and second arms that extend away from ABS 19. Coil connection 50 extends in a direction approximately parallel to ABS 19 and electrically connects coil 30 with a pair of terminal bond pads 51 of the C1 layer. Coil connection 50 is disposed in the same general plane as the C1 coil layer. Alternatively, resistive heating element 41 (or 42) may be located farther away from ABS 19. For example, the portion of heating element 41 nearest the air-bearing surface may be disposed 20 μm to 60 μm from ABS 19.

Figure 5:
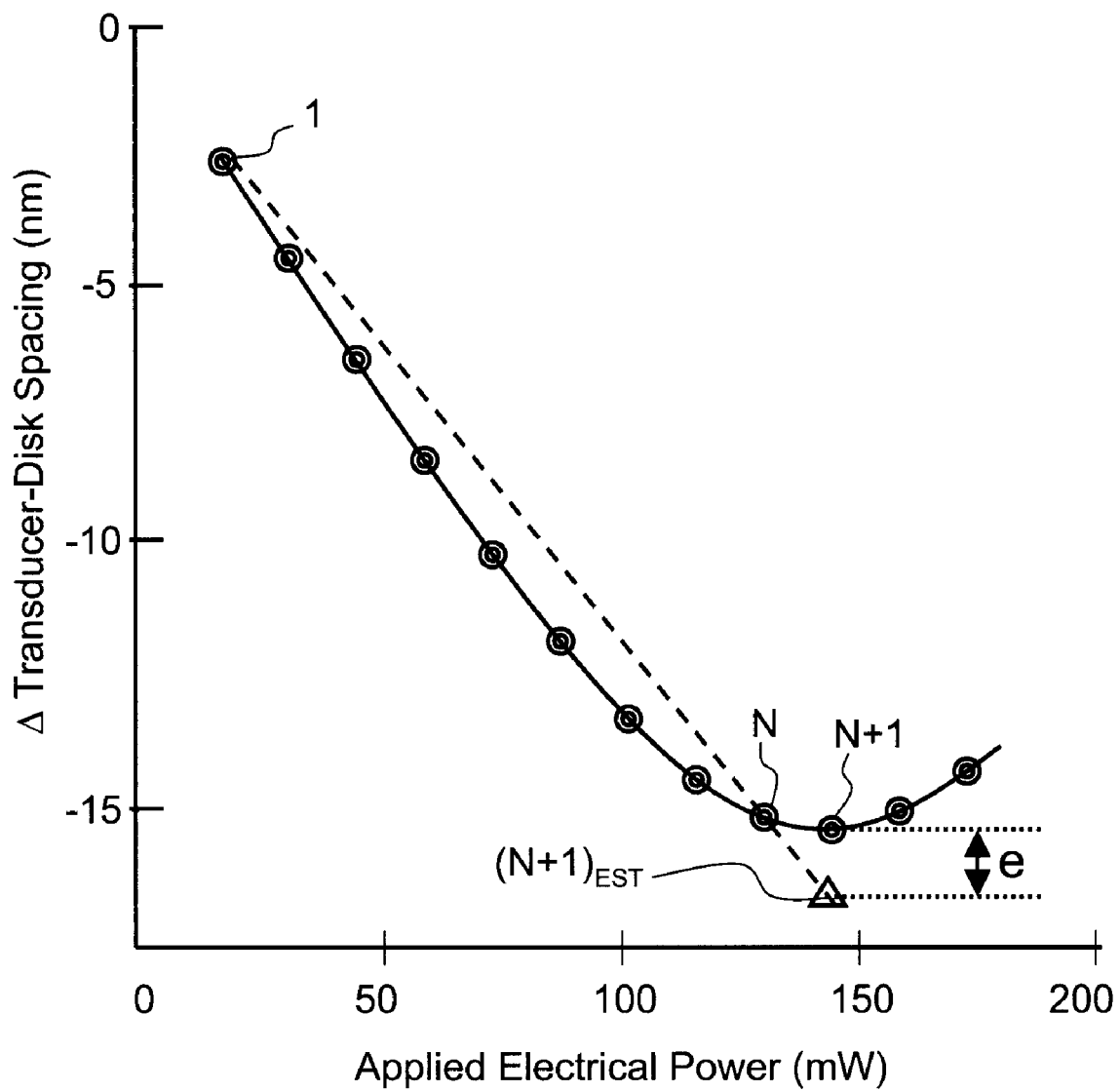
FIG. 5 is a graph of changes in transducer-to-disk spacing resulting from application of various electrical powers to a head-based flying height actuator.

FIG. 5 is a graph of changes in transducer-to-disk spacing resulting from application of various electrical powers to a head-based flying height actuator. The change in transducer-disk spacing can be determined by a conventional method of measuring a read-back signal from the head, and then determining a ratio between a first harmonic component and a third harmonic component of the read-back signal. The change in transducer-disk spacing is shown in FIG. 5 in units of nanometers, and the electrical power applied to the head-based flying height actuator is measured in units of milliwatts (mW). Of course, one well-known way to change the power applied to the head-based flying height actuator is to change the voltage applied to the head-based flying height actuator, and that is contemplated herein.

In the embodiment of FIG. 5, as the power applied to the head-based flying height actuator is increased, the reduction in transducer-disk spacing becomes greater until approximately 140 mW of applied electrical power is reached. Applied electrical powers in that range bring about phenomena associated with touch down (e.g. an increase in push back and/or an increase in flying height oscillations caused by contact forces), which diminish the rate that transducer-disk spacing is reduced by further increases in applied electrical power, and which can ultimately cause transducer-disk spacing to increase with still further increases in applied electrical power. Touch-down is defined to occur when the transducer-disk spacing is reduced to the point where the head is in intermittent contact with a corresponding disk, or thermal expansion push-back becomes excessive. The power applied to the head-based flying height actuator when touch-down occurs is thus defined to be the touch-down power $P_{TD}$.

The touch-down power for the embodiment shown in FIG. 5 can be determined according to the exemplary method depicted in FIG. 6.

The point labeled 1 in FIG. 5 is determined according to step 204 in FIG. 6. Preferably, the power applied to the flying height actuator at the point labeled 1 corresponds to a voltage applied to the flying height actuator that is less than 0.7 Volts. Also preferably, it is first confirmed that spacing decreases with increasing power at the point labeled 1 (or else a subsequent point, for which local spacing decrease can be confirmed, is chosen as the point labeled 1).

The point labeled N in FIG. 5 is determined according to step 208 in FIG. 6. In step 210 of FIG. 6, a linear relationship between the change in transducer-disk spacing (S) and electrical power (P) is derived to fit the point labeled 1 in FIG. 5 and the point labeled N in FIG. 5. Specifically, if point 1 corresponds to a first power of $P_1=14$ mW, and a first spacing of $S_1=-2.5$ nm, and point N corresponds to a second power of $P_N=130$ mW, and a second spacing of $S_N=-15.1$ nm, then the slope (rise/run) of the linear relationship would be $-12.6$ nm/116 mW=$-0.11$ nm/mW, and the y-intercept of the linear relationship would be approximately $-1$ nm. Thus, the linear relationship could be expressed as:

$$S=(-0.11 \text{ nm/mW})\cdot P-1 \text{ nm}$$

The next measured point on the graph of FIG. 5 is labeled N+1, and is determined according to step 212 in FIG. 6. The point labeled N+1 in FIG. 5 corresponds to a third electrical power $P_{N+1}=144$ mW and a third spacing $S_{N+1}=-15.2$ nm. However, according to step 214 the linear relationship (derived in step 210) can be used to estimate the third spacing as:

$$S_{(N+1)EST}=(-0.11 \text{ nm/mW})\cdot(144 \text{ mW})-1 \text{ nm}=-16.8 \text{ nm}$$

The error labeled as "e" between the third spacing and the estimated third spacing in FIG. 5 is therefore: $e=|S_{(N+1)}-S_{(N+1)EST}|=|-15.2 \text{ nm}-(-16.8 \text{ nm})|=1.6$ nm. Alternatively, the error can be calculated using the following equivalent formula:

$$e = (S_{N+1} - S_1) - \frac{(S_N - S_1)}{(P_N - P_1)}(P_{N+1} - P_1),$$

which gives the same result (i.e. 1.6 nm).

In steps 216 and 218 of FIG. 6, the touch-down power $P_{TD}$ is defined to be substantially equal to the second electrical power if the error "e" between the third spacing and the estimated third spacing is larger than a first threshold. If the first threshold is chosen to be 0.7 nm, then $P_{TD}$ will be defined to be equal to $P_N$=130 mW in the embodiment of FIG. 5 (since 1.6 nm>0.7 nm).

Of course, the first threshold chosen for a given embodiment will depend upon several factors including the magnitude of the steps in power between measurement points for that embodiment. Preferably, the steps in power are chosen to be in a range between 5 mW and 20 mW, and the first threshold is preferably less than 1 nm. For example, in the embodiment of FIG. 5, the steps in power between measurement points were chosen to be approximately 14 mW and the first threshold was chosen to be 0.7 nm. The first threshold for a given embodiment may also depend on whether the subject disk drive is a single platter disk drive or a multi-platter disk drive. The first threshold for a multi-platter disk drive is preferably in the range 0.5 nm to 0.7 nm.

In the foregoing description of FIG. 5 and FIG. 6, it was assumed that $S_N$ and $S_{N+1}$ were determined by measurement, perhaps based on a ratio between a first harmonic component and a third harmonic component of a measured read-back signal from the head. However, it is also possible to determine $S_N$ and/or $S_{N+1}$ based on a non-linear curve fit to a plurality of preceding measured data points. For example, a non-linear relationship having a functional form of $S=A(P)P^2+cP+d$ can be derived to fit to the data shown in FIG. 5, where S is the spacing between the transducer and the disk, P is the electrical power applied to the flying height actuator, A(P) is a non-linearity coefficient that may be a scalar in the case of fitting with a quadratic polynomial, and c and d are scalars. Deriving the non-linear relationship comprises calculating A(P), c, and d to achieve a best fit of the data by a conventional curve fitting technique. In the case of fitting with a cubic polynomial, A(P) can have the functional form: $A(P)=aP+b$, where a and b are scalars. In such a case, the error may be calculated using the formula: $e=P_3(P_3-P_2)\{a(P_3+P_2)+b\}$.

As shown in step 220 of FIG. 6, in some cases even if the error between the third spacing and the estimated third spacing does not exceed the first threshold (i.e. first condition is not met), the touch-down power $P_{TD}$ may be defined to be substantially equal to the second electrical power if a difference between the third spacing and the second spacing is smaller than a second threshold (i.e. second condition is met). FIG. 5 illustrates why such an inequality (i.e. the second condition) may indicate touch-down, because a flattening of the local slope of the curve, attributable to touch-down, can be observed near points N and N+1. For example, if the second threshold for the embodiment of FIG. 5 is chosen to be 0.5 nm, then satisfaction of the second condition also leads to $P_{TD}$ being defined to be $P_N$=130 mW because the local slope of the curve near point N is close enough to horizontal that:

$|S_{(N+1)}-S_N|<0.5$ nm.

If neither the first condition nor the second condition are initially satisfied, then the point N is indexed (increased by one) and the process is repeated as depicted in the feedback arrow on the right-hand side of FIG. 6. In other words, point N+1 is treated as point N was before, and a new linear relationship is derived to fit the point labeled as 1 and the point that was previously labeled as N+1, and so on, until satisfaction of either the first condition or the second condition leads to the definition of the touch-down power $P_{TD}$.

Preferably, each applied electrical powers and corresponding transducer-disk spacing is digitally stored while the foregoing method is employed to determine the touch-down power. Such digital storage may facilitate subsequent determination of a desired electrical power to be applied to the flying height actuator during operation of the head, to achieve a desired operating transducer-disk spacing. Specifically, once the desired operating transducer-disk spacing is specified, an interpolation among applied electrical powers corresponding to higher and lower transducer-spacings can be performed. Such an interpolation based on head-specific data (i.e. transducer-disk spacings determined for a particular head, and corresponding electrical powers applied to the flying height actuator of that head) may yield a more accurate determination of desired operating electrical power than other methods that rely upon non-head specific data (e.g. predictions of behavior based on design characteristics and/or measured data from other heads of the same or similar design).

In the foregoing specification, the invention is described with reference to specific exemplary embodiments thereof, but those skilled in the art will recognize that the invention is not limited thereto. It is contemplated that various features and aspects of the above-described invention may be used individually or jointly and possibly in an environment or application beyond those described herein. The specification and drawings are, accordingly, to be regarded as illustrative and exemplary rather than restrictive. The terms "comprising," "including," and "having," as used herein are intended to be read as open-ended terms.

What is claimed is:

1. A method for defining a touch-down power for a head that has a head-based flying height actuator, the head including a transducer to read data from a disk, the method comprising:
    determining a first spacing between the transducer and the disk when a first electrical power is applied to the flying height actuator;
    determining a second spacing between the transducer and the disk when a second electrical power is applied to the flying height actuator, the second electrical power larger than the first electrical power;
    deriving a linear relationship between power and spacing, the linear relationship fit to the first electrical power, the first spacing, the second electrical power, and the second spacing;
    determining a third spacing between the transducer and the disk when a third electrical power is applied to the flying height actuator, the third electrical power larger than the second electrical power;
    calculating an estimated third spacing between the transducer and the disk corresponding to application of the third electrical power to the flying height actuator, the estimated third spacing calculated using the derived linear relationship and the third electrical power; and
    defining the touch-down power to be substantially equal to the second electrical power if a first condition is satisfied, the first condition being satisfied if an error between the third spacing and the estimated third spacing is larger than a first threshold.

2. The method of claim 1, wherein the second spacing is determined based on a read-back signal from the head while the second electrical power is applied to the flying height actuator.

3. The method of claim 1, wherein the error is calculated to be:

$$e = (S_3 - S_1) - \frac{(S_2 - S_1)}{(P_2 - P_1)}(P_3 - P_1),$$

where e is the error, $S_1$ is the first spacing, $P_1$ is the first electrical power, $S_2$ is the second spacing, $P_2$ is the second electrical power, $S_3$ is the third spacing, and $P_3$ is the third electrical power.

4. The method of claim 1, wherein the third electrical power minus the second electrical power is in a range between 5 mW and 20 mW.

5. The method of claim 1, wherein determining the second spacing comprises:
   measuring a plurality of spacings between the transducer and the disk for a corresponding plurality of electrical powers applied to the flying height actuator;
   deriving a non-linear relationship between power and spacing, the non-linear relationship fit to the plurality of electrical powers and the measured plurality of spacings; and
   calculating the second spacing by using the non-linear relationship and the second electrical power.

6. The method of claim 5, wherein the non-linear relationship has a functional form of: $S=A(P)P^2+cP+d$, where S is the spacing between the transducer and the disk, P is the electrical power applied to the flying height actuator, A(P) is a non-linearity coefficient, c is a linear slope, and d is an intercept, and deriving the non-linear relationship comprises calculating A(P), c, and d.

7. The method of claim 6, wherein A(P) has a functional form of: $A(P)=aP+b$, where a and b are constants such that the non-linear relationship is a cubic polynomial.

8. The method of claim 7, wherein the error is calculated to be:

$$e=P_3(P_3-P_2)\{a(P_3+P_2)+b\},$$

where e is the error, P2 is the second electrical power, and P3 is the third electrical power.

9. The method of claim 5, wherein a rate of change of spacing per unit power at the first spacing is greater than a rate of change of spacing per unit power at the second spacing.

10. The method of claim 1, wherein the first threshold is less than 1 nanometer.

11. The method of claim 1, wherein the first threshold is in a range between 0.5 nanometer and 0.7 nanometer.

12. The method of claim 1, wherein at least one of the first spacing, the second spacing, and the third spacing is determined based on a read-back signal from the head.

13. The method of claim 1, wherein if the first condition is not satisfied, the touch-down power is defined to be substantially equal to the second electrical power if a second condition is satisfied, the second condition being satisfied if a difference between the third spacing and a second spacing is smaller than a second threshold.

14. The method of claim 13, wherein if the first condition and the second condition are unsatisfied, then the method further comprises:
   determining a fourth spacing between the transducer and the disk when a fourth electrical power is applied to the flying height actuator, the fourth electrical power larger than the third electrical power;
   re-deriving the linear relationship between power and spacing, the linear relationship fit to the first electrical power, the first spacing, the third electrical power, and the third spacing;
   calculating an estimated fourth spacing between the transducer and the disk corresponding to application of the fourth electrical power to the flying height actuator, the estimated fourth spacing calculated using the re-derived linear function and the fourth electrical power; and
   defining the touch-down power to be substantially equal to the third electrical power if an error between the fourth spacing and the estimated fourth spacing is larger than the first threshold.

15. The method of claim 1, wherein the method further comprises confirming that spacing decreases with increasing power at the first electrical power.

16. The method of claim 1, wherein the first electrical power applied to the flying height actuator corresponds to a voltage applied to the flying height actuator that is less than 0.7 Volts.

17. The method of claim 1 further comprising digitally storing a first plurality of values corresponding to electrical powers applied to the flying height actuator, and storing a second plurality of values corresponding to resulting transducer-disk spacings.

18. The method of claim 17 further comprising:
   selecting a first value from the second plurality of values that corresponds to a transducer-disk spacing exceeding a desired operating transducer-disk spacing;
   selecting a second value from the second plurality of values that corresponds to a transducer-disk spacing that is less than the desired operating transducer-disk spacing;
   identifying a third value from the first plurality of values that corresponds to the first value;
   identifying a fourth value from the first plurality of values that corresponds to the second value; and
   interpolating between the third and fourth values to determine a desired electrical power to be applied to the flying height actuator during operation of the head.

* * * * *